Sept. 5, 1939. R. P. LEWIS 2,171,834
AUTOMATIC POWER TRANSMITTING MECHANISM
Filed Sept. 20, 1932 3 Sheets-Sheet 1
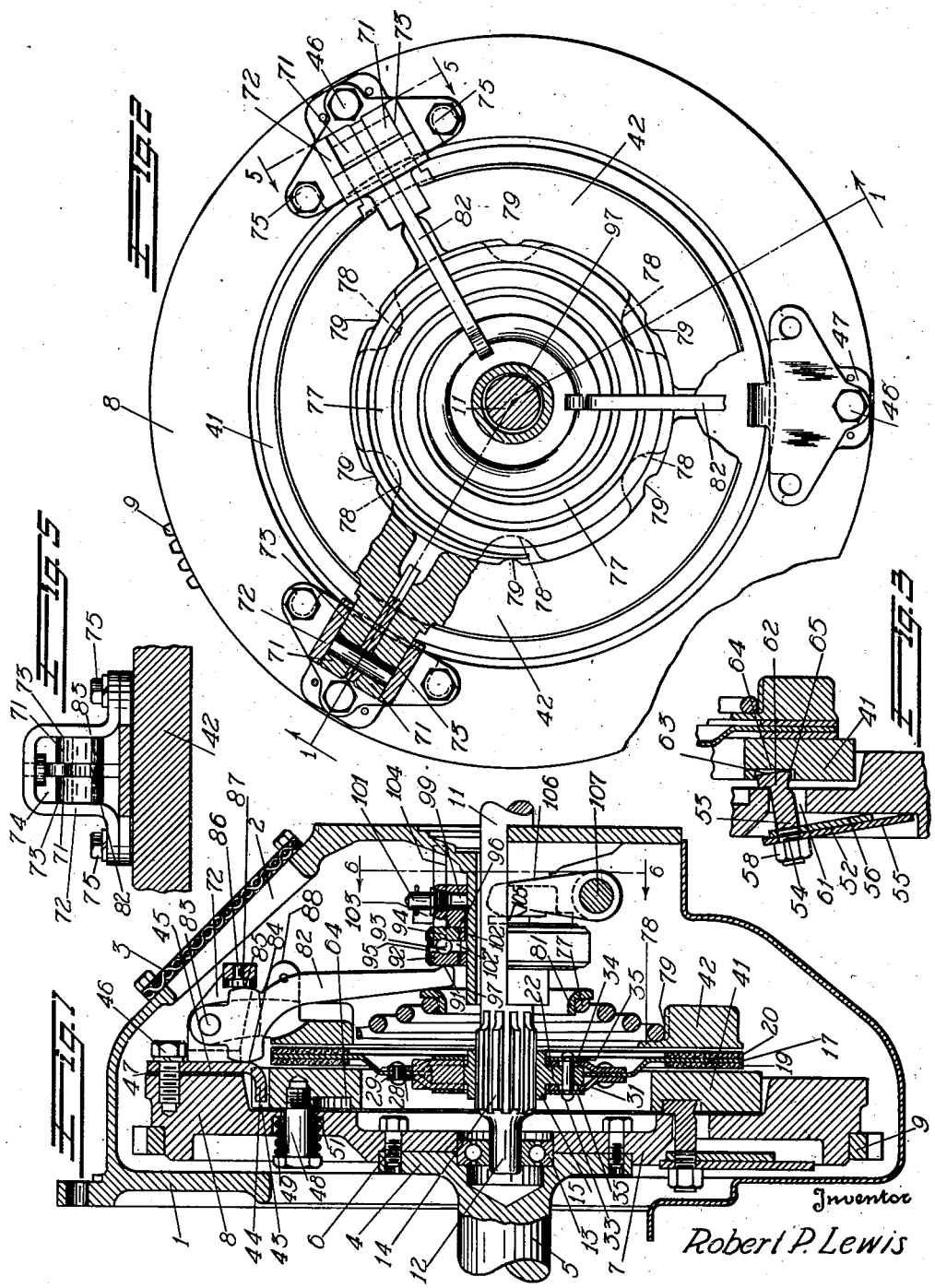
Inventor
Robert P. Lewis
By Strauch, Hoffman
Attorneys

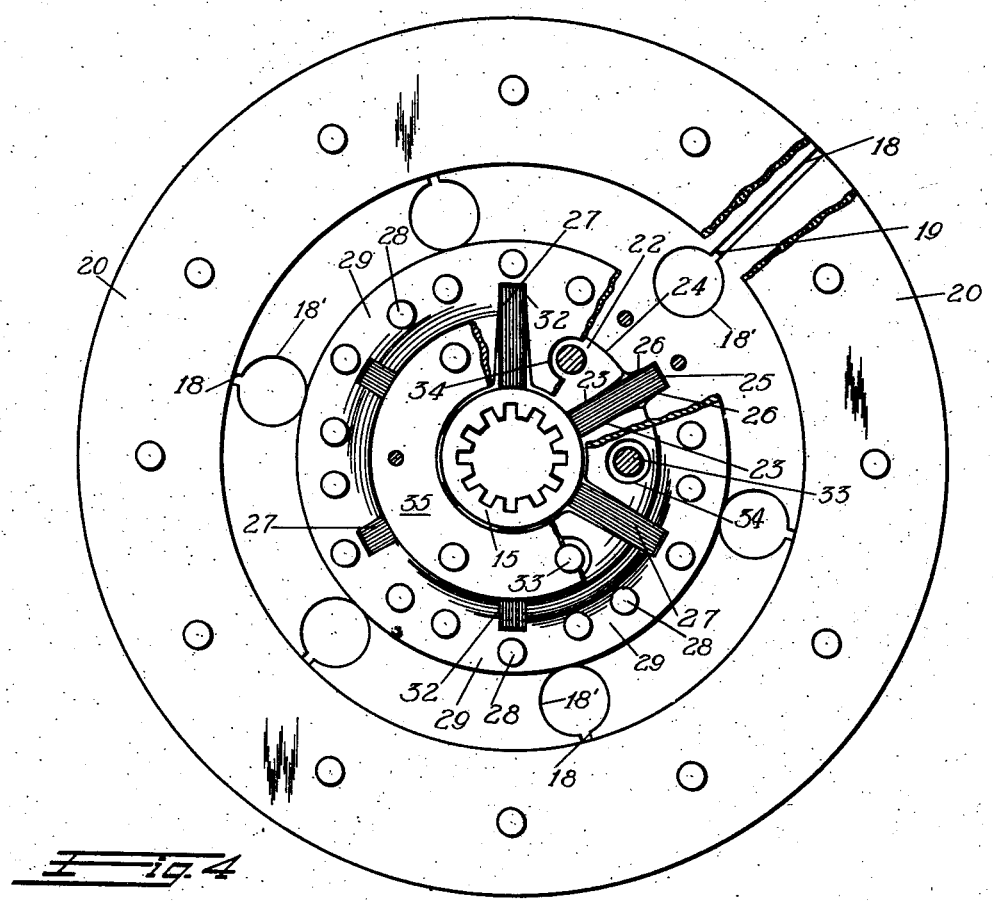
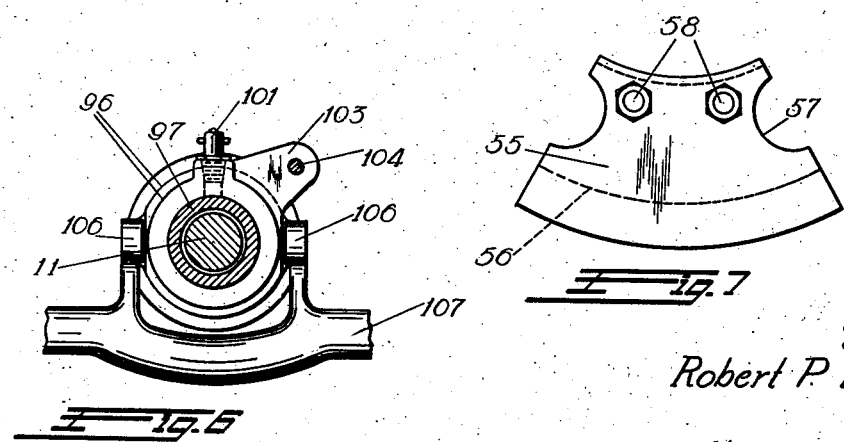

Sept. 5, 1939.   R. P. LEWIS   2,171,834
AUTOMATIC POWER TRANSMITTING MECHANISM
Filed Sept. 20, 1932   3 Sheets-Sheet 3
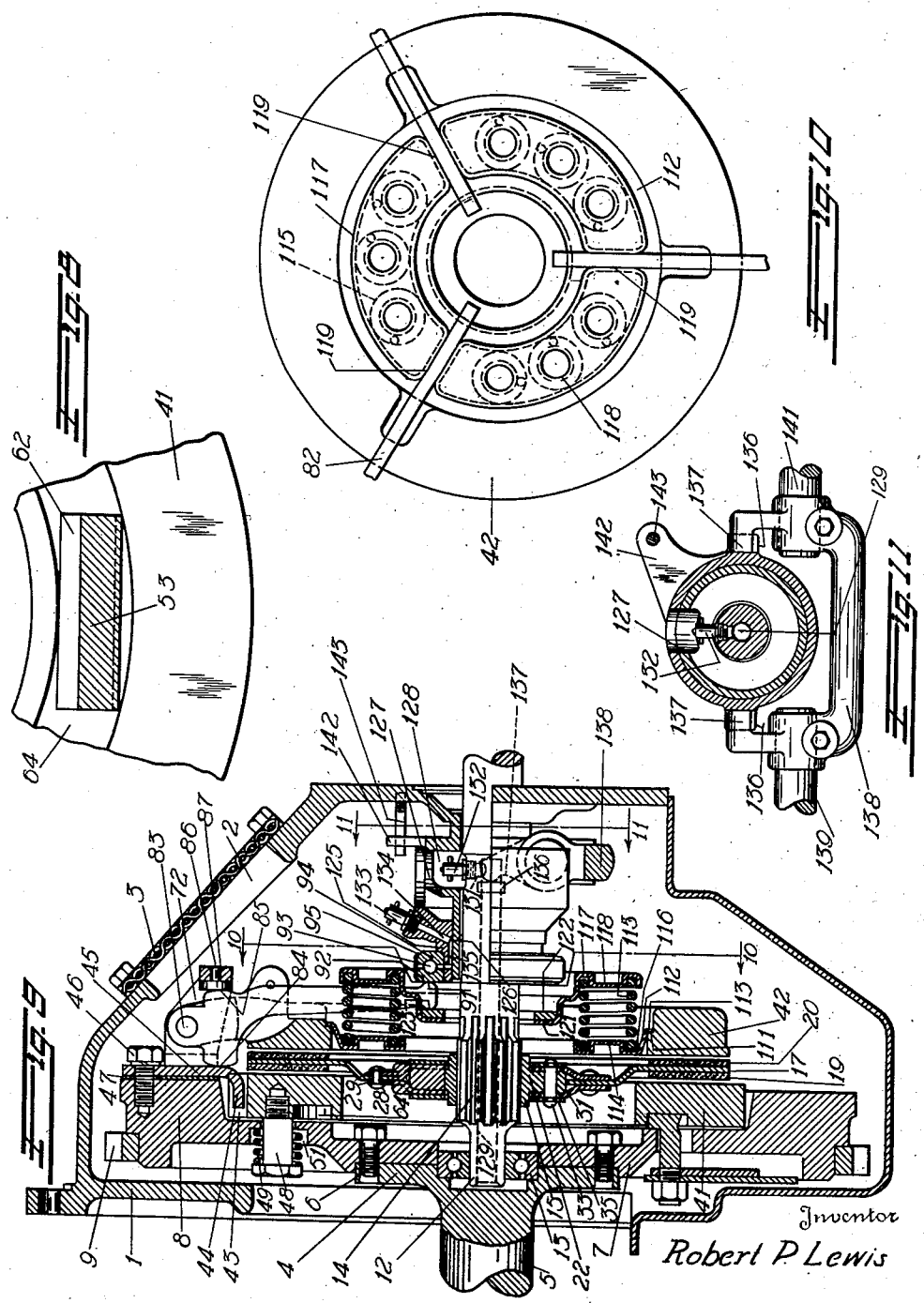
Inventor
Robert P. Lewis
By Strauch & Hoffman
Attorneys Patented Sept. 5, 1939

2,171,834

UNITED STATES PATENT OFFICE 2,171,834

AUTOMATIC POWER TRANSMITTING MECHANISM

Robert P. Lewis, Toledo, Ohio, assignor to The Automatic Drive & Transmission Company, New York, N. Y., a corporation of New Jersey Application September 20, 1932, Serial No. 634,048

12 Claims. (Cl. 192—105)

The present invention relates to automatic or self-operating drive and clutch mechanisms for transmitting power from a driving shaft to a driven shaft, and more particularly the present invention relates to automatic drive and clutch mechanisms especially designed and adapted to be used in connection with motor driven vehicles.

In applications Serial No. 595,184, filed February 25, 1932, and Serial No. 606,238, filed April 19, 1932, automatic or self-operating drive and clutch mechanisms of the character above mentioned are disclosed, and broadly stated, one of the objects of the present invention is to refine certain details of the constructions there shown and to provide clutch mechanisms that are very efficient and effective and which particularly lend themselves to low cost, modern production methods.

More specifically, one of the objects of the present invention is to provide drive and clutch mechanisms of the character mentioned wherein novel means is employed for associating the centrifugal weights with the automatic plate and to provide an improved form of centrifugal weight.

In view of the fact that more heat is generated during operation of drive and clutch mechanisms of the character mentioned than in ordinary manually operable clutches of like capacity, they must be capable of dissipating heat very rapidly and it is accordingly another object of the present invention to provide clutch mechanisms that are capable of rapidly dissipating heat from the elements thereof by radiation and convection as well as efficiently disposing of solid lubricant and other material that may be freed from the clutch facings during operation.

Another object of the present invention is to provide drive and clutch mechanisms of the character indicated wherein the driving pressure is evenly distributed about the entire areas of the clutch plates, giving the clutch facings a long life, and producing smooth and efficient clutch operation.

Still another object of the present invention is to provide drive and clutch mechanisms of the character mentioned wherein novel means are employed for keying the automatic plate to the flywheel so that the automatic plate is caused to rotate therewith, and yet is free to move axially thereof for clutching and declutching movements.

A further object of the present invention is to provide drive and clutch mechanisms of the character stated wherein the positive plate is so designed and arranged that when the engine is idling and the plates are disengaged, the positive plate will be disposed in absolute parallelism with the automatic plate and the driven member, so that when the automatic plate comes into contact with the driven member, the driven member will be caused to contact with the entire area of the positive plate simultaneously and grabbing or harsh clutch operation is avoided.

A still further object of the present inventiton is to provide drive and clutch mechanisms of the self-operating or automatic type, wherein the positive plate may be adjusted angularly with respect to the automatic plate, whereby absolute parallelism of the two plates may be readily established.

Another object of the present invention is to provide an improved vibration and impulse dampener in combination with clutch and drive mechanisms of the character mentioned that in addition to compensating for torsional vibrations of the crankshaft, and smoothing out the pulsating torque delivery inherent with an internal combustion engine having a low number of cylinders particularly at the lower speeds when picking up the load in slipping drive so related to the clutch elements that it will afford a resilient connection between the driving and driven shafts, and the slipping drive and clutch action will be materially improved.

A further object of my invention is to provide drive and clutch mechanisms of the character indicated wherein means are provided for effectively lubricating the pilot bearing.

Other objects of the present invention will become apparent as the description thereof proceeds in connection with the drawings. In the drawings:

Figure 1 is a longitudinal sectional view of a clutch mechanism forming part of the present invention, the section through the flywheel being taken approximately on the line 1—1 of Figure 2.

Figure 2 is a view of the drive and clutch mechanism disclosed in Figure 1 as it appears when viewed from the right hand side of that figure and with the mechanism rotated through the angle of 60° and with the clutch housing and throwout mechanism removed for sake of clarity of illustration.

Figure 3 is a fragmentary view with parts in section of the mechanism illustrated in Figure 1 of the drawings showing the parts exposed in the positions they assume when the clutch is engaged.

Figure 4 is a plan view on an enlarged scale and with parts in section of the driven member employed in the clutch mechanism disclosed in Figure 1.

Figure 5 is a detailed sectional view taken on the line 5—5 of Figure 2 on a slightly enlarged scale.

Figure 6 is a view taken approximately on the line 6—6 of Figure 1, looking in the direction of the arrows.

Figure 7 is a plan view of one of the centrifugal weights employed in the clutch mechanism illustrated in Figure 1.

Figure 8 is a fragmentary view illustrating the cooperation of a centrifugal weight with the groove formed in the automatic plate of the drive and clutch mechanism shown in Figure 1.

Figure 9 is a longitudinal sectional view of my improved drive and clutch mechanism embodying a modified throwout mechanism and spring mechanism incorporated therein.

Figure 10 is a section taken on line 10—10 of Figure 9 as seen when viewed in the direction of the arrows when the mechanism is rotated through the angle of 60°.

Figure 11 is a view taken on line 11—11 of Figure 9 looking in the direction of the arrows.

Referring to the drawings, wherein like reference characters designate like parts throughout the several figures thereof, a housing generically designated as 1 houses the mechanism and is provided with the usual hand opening 2, which is closed by screen 3 for the purpose of allowing free entrance and exit of air from the housing and for preventing the introduction of extraneous matter therein for a purpose that will presently appear. Secured to flange 4 of engine or driving shaft 5 by means of bolts 6 in well known manner is web portion 7 of a special type of flywheel 8. The periphery of flywheel 8 is provided with the usual starting gear 9.

Disposed in axial alignment with shaft 5, and mounted for rotation, is driven shaft 11 which is reduced at 12 at one end and journaled in a suitable anti-friction bearing assembly 13, secured in a bore in the end of shaft 5.

Driven shaft 11 is adapted to have the other end thereof operably connected to a suitable gear changing apparatus of well known construction (not shown) for amplifying the torque applied to the final driven member. Driven shaft 11 has a splined portion 14 on which a correspondingly splined hub 15 is slidably mounted. Hub 15 is resiliently connected to driven disk 17 by means of a dampener mechanism that will presently be described. Disk 17 is provided with a plurality of radially extending slots 18, which extend to the periphery thereof and terminate at their inner ends in openings 18'. Slots 18 give disk 17 extreme flexibility in an axial direction and permit accommodation to slight angular misalignment of the clutch plates, while apertures 18' provide distribution of air each side of disk 17 as will be more particularly pointed out.

Each face of disk 17 near the periphery thereof is provided with a facing 19 and 20 respectively, which may consist of any material that has the required characteristics to give the correct frictional gripping force, and at the same time has wearing qualities adapting it for this purpose. I prefer, however, to use the lubricated type of material disclosed in the application of Charles B. Heinrich, Serial No. 580,172, filed December 10th, 1931, which issued as Patent 1,979,880 on November 6, 1934, embodying large percentages of graphite, which in practice have given very satisfactory results in a slipping drive and clutch mechanism of this character. Frictional faces 19 and 20 may be secured to disk 17 in any suitable manner as for instance by means of rivets or the like.

Referring more particularly to Figure 4 of the drawings, hub 15 is provided with a flange 22 which is slotted at intervals around its periphery to provide substantially rectangular recesses having walls 23 which constitute driving faces. Walls 23 near the outer periphery of flange 22 are given a slightly curved configuration for a purpose that will presently appear. The driving recesses formed in flange 22 are shown in the present instance as being of six in number, and while this number has been found to give very good results in practice, it is to be understood that the recesses could be more or less than six in number without sacrificing the advantages of the present invention. Flange 22 rather snugly fits in an aperture 24 formed in plate 17 for limited angular movement with respect thereto. Substantially rectangular notches 25 having walls 26 providing driving faces are formed in plate 17 and are coextensive with those formed in flange 22. The inner ends of side walls 26 of notches 25 formed in plate 17 slightly diverge for a purpose that will presently appear.

Disk 17 is resiliently connected to hub 15 for yieldingly transmitting torque thereto by means consisting of leaf spring units or packs each consisting of a plurality of leaf springs 27 which are disposed rather snugly at one end thereof in recesses 23 formed in flange 22, and at the other end seat rather closely in recesses 25 formed in disk 17.

From the structure so far developed it will be seen that should a sudden rotational impulse be given disk 17 in clockwise or counter-clockwise direction, hub 15 will not immediately respond thereto but springs 27 will flex and take a position in surface contact with walls 23 and 26. It is therefore seen that springs 27 establish a resilient yielding connection between disk 17 and hub 15, thus avoiding the possibility of transmitting shocks from one member to the other. It will moreover be seen that this resilient coupling is double acting for instance, if a vehicle provided with this mechanism, is proceeding down grade with the transmission in high gear and with the clutch disengaged and the operator should suddenly reengage the clutch, hub 15 becomes the driving member, and the sudden rotational impulse transmitted by member 15 to member 17 is absorbed in large part by springs 27. If the resilient connection disclosed were not interposed between hub 15 and disk 17, a severe shock would be transmitted from hub 15 to disk 17 upon reengagement of the clutch with possible damage to the driving mechanism. However, with the present resilient connection incorporated in the mechanism, it is seen, that upon reengagement of the clutch, springs 27 will merely flex in the opposite direction, absorbing any torque impulse that might result in a damaging shock to the mechanism. Springs 27 are preferably so designed and tempered to present such a degree of stiffness, that during normal torque delivering operations, they will not be flexed to their fullest extent, or come into full contact with the curved faces defining notches 23 and 25, but will only be slightly flexed, accordingly each pulsation of torque delivered by the engine can be absorbed and stored in or cushioned by the springs, resulting in smooth driving torque delivery even at lower speeds when the mechanism is picking the load up.

As shown in the drawings, when leaf springs 27 are flexed so as to lie over the full area of the curved faces defining notches 23 and 26, this condition corresponds to any reasonably large sudden impulse transmitting effort from one member to the other, but in some instances, in order to prevent undue flexing of springs 27 stop means combined with means that securely hold springs 27 in assembled relation with disk 17 and hub 15 are provided.

Disposed on either side of disk 17, and rigidly secured thereto by means of rivets 28 or the like are a pair of plates 29 (Figure 1). Plates 29 are offset at 31 to provide a sliding fit with flange 22 formed on hub 15. Plates 29 are further provided with recesses 32 which are coextensive with recesses 25 formed in disk 17 inwardly to the periphery of disk 17, where the walls thereof diverge as shown in Figure 4 of the drawings.

The clearance provided between springs 27 and the diverging walls of plate 29 is sufficient to allow normal flexing movement of springs 27 under fairly severe conditions and it will be noted that the outer portions of the walls defining recesses 32 in plate 29 are flush with the recesses 25 formed in plate 17, and therefore form additional driving faces, and the inner extremities of recesses 32 form stops, so that when springs 27 have been flexed to a predetermined normal extent, the outer springs 27 are in contact with the diverging walls of plate 29, and a positive drive is thereafter established between disk 17 and hub 15. It is to be understood that springs 27 are designed to absorb any reasonably large torque impulse without flexing sufficiently to contact the diverging faces of recesses 32. Thus the limiting walls of recesses 32 are seen to constitute a safety measure to prevent springs 27 from being stressed beyond their elastic limit, which might cause them to take permanent set.

A slidable connection is provided between the inner periphery of plate 29 and flange 22 to permit their relative movement during flexing of springs 27, by means of shouldered studs 33 which extend through oversize openings 34 formed in plate 29. Pins 33 are inserted in openings 34, and a plate 35 is disposed on opposite sides thereof and through which the reduced portions of pins 33 extend. After assembly, the ends of pins 33 are then headed over as shown in Figure 1. It will therefore be seen that plates 35 are rigidly connected to each other and permit a limited range of movement of disk 17 on flange 22 of hub 15. Referring again to Figure 1 of the drawings, it will also be seen that plates 35 securely hold springs 27 in assembled relation with hub 15 and disk 17.

Each facing 19 and 20 cooperates with a suitable annular plate for effecting a driving connection between driving shaft 5 and driven shaft 11. Plate 41 engaging facing 19 is termed the automatic plate and plate 42 engaging facing 20 is termed the positive plate.

The construction of automatic plate 41 and its actuating mechanism will now be described. Plate 41 is of substantial thickness in order that it may possess a certain degree of rigidity and thereby prevent distortion or warpage under the temperatures and pressures of operation. Disposed at preferably 120° intervals around the periphery of plate 41 are key slots 43, each of which cooperates with the curved extremity 44 of driving plate or key member 45 which is secured to the flywheel face by means of bolts 46 or the like. Removably disposed between plates 45 and the face of the flywheel are a plurality of shims 47 which may be inserted or removed for the purpose of adjusting plate 45 toward and away from the flywheel face. Shims 47 are slotted so that one or more of them may be removed or inserted by merely loosening bolts 46.

Automatic plate 41 is urged toward the flywheel web by means of a plurality of hold-back bolts 48 which pass through apertures in the flywheel web and are tapped in the rear face of automatic plate 41 and their heads are acted upon by coiled compression springs 49 seating in apertures 51 formed in the rear face of the flywheel web.

Plate 41 is caused to move away from the flywheel web against the action of springs 49 for slipping drive and clutching purposes by means of a centrifugal mechanism responsive to speed variations of the flywheel. Centrifugal weights, designated generically by 52, are preferably six in number and are disposed between the hold-back bolts assemblies on the rear face of the flywheel. Each centrifugal weight preferably consists of a lever section 53 which terminates at its outer end in a pair of threaded extremities 54. Fitted over extremities 54 are a pair of weight elements 55 and 56, each of them being cut away to provide a recess 57 at each end thereof to accommodate the adjacent hold-back bolt assembly. Centrifugal weights 55 and 56 are segmental in form and are preferably constructed of sheet metal stampings, held in place on the weight levers 53 by means of nuts 58, threaded on members 54. Lever sections 53 are of substantial width and extend through chordal slots 61 formed in the flywheel web between each pair of hold-back bolt assemblies. Lever sections 53 carry at their extremities heads 62, each of which is provided with a flat face 63 that abuts the bottom face of an annular bearing recess or groove 64 which is preferably machined in automatic plate 41. Heads 62 are also provided with a reaction face to abut the face of the flywheel web, the edge of which is designed for fulcruming engagement therewith during operation of the weights. Heads 62 have their outer sides relieved to provide knife-like edges 65 which are adapted to rotate or pivot on the bottom face of recess 64 formed in automatic plate 41. Referring more particularly to Figure 8 of the drawings, each extremity of knife-edge 65 is seen to engage the outer wall of recess 64, while the inner face of head 62 engages the inner wall of recess 64, thereby preventing rotation of heads 62 and keeping them in proper assembled relationship at all times. Apertures 61 are seen to be of ample size for the reception of heads 62, and when plate 41 is backed away from the flywheel web, weights 52 can be removed from the mechanism in this manner. This is a desirable feature because the weights can then be entirely assembled prior to their incorporation with the mechanism, cutting down production costs. Knife edge 65 is adapted to cooperate with the flat bottom surface of recess 64 and thereby act in line contact upon plate 41 and for a substantial distance across the face thereof, whereby uniform distribution of pressure around the entire area of the automatic plate is affected. In connection with this structure it should be particularly noted that no expensive machinery operations are required to provide an accurate seat for the centrifugal weights because annular groove 64 is readily machined in plate 41 in a single inexpensive operation and the weights are held in position in operation by a three point contact.

The mass of weight elements 55 and 56, and the number employed in a particular installation is determined by the consideration of the combined pressure that they must transmit in such installation. In the drive and clutch shown, which is for a "Plymouth" automobile, six equally spaced weight arrangements are employed.

It will therefore be seen, as the speed of the flywheel increases, each weight assembly 52 will gradually swing outward about the edge 65 as a pivot, in response to centrifugal force. As this occurs, the reaction faces of heads 62 will abut and slide on the flywheel web and the knife edge 65 will engage and pivot upon the flat bottom surface of annular grooves 64 in automatic plate 41, forcing the plate away from the web and into clutching engagement with facing 19 of disk 17. It will be noted that there is very little sliding engagement of parts in the arrangement disclosed and that the contact at 65 is of a knife-edge pivotal character. The sole sliding movement present is between the flywheel web and the reaction faces of heads 62. This movement is small and little frictional resistance thereto exists, so that plate 41 is given a smooth and easy movement and clutch grabbing is avoided. The positions taken by the parts under these conditions are shown in Figure 3, wherein both weight elements 55 and 56 are seen to be at rest against the flywheel web.

Positive plate 42 is caused to rotate with flywheel 8 and is permitted to move axially thereof for clutching and declutching purposes by means of pairs of ears or lugs 71 that are provided on positive plate 42 at approximately 120° intervals, and are preferably integral thereto. Lugs 71 extends outwardly beyond the periphery of plate 42 into saddle members 72 which provide driving faces 73 that closely abut the opposite sides of each lug assembly, and are adapted to rest in sliding engagement therewith. Saddle members 72 are provided with a clearance space indicated at 74 that is sufficient to accommodate lugs 71 throughout their entire range of movement. The lower ends of saddle members 72 are deflected to lie in a horizontal plane and are apertured and secured to the top face of plate 45 by means of cap screws 75 or the like. Saddle members 72 are preferably formed of sheet metal stampings since their design renders this material entirely suitable for the purpose. It is therefore seen that positive plate 42 is mounted for rotation with flywheel 8 in a very economical manner and is at the same time permitted to move axially thereof throughout a limited range of movement.

Plate 42 is normally urged toward the flywheel web by means of a compression spring 77 that rests against seats 78 extending inwardly from the inner periphery of plate 42, and associated with each seat 78 is a rib 79 that serves to space the outer convolution of the springs 77 from the inner wall of plate 42, so that circulation of air can take place therebetween. The other end of spring 77 seats upon and reacts against a collar 81 that in turn firmly rests against a plurality of throwout levers 82. Throwout levers 82 are preferably three in number so that collar 81, in response to the action spring 77 can rock into a stable position on a three point support and thereby exert an equal pressure upon each lever. The outer end of each throwout lever 82 is disposed between each pair of lugs 71 and is journaled therein on a pin 83 passing through apertures in lugs 71. In view of the fact that pins 83 abut walls 73 of saddle members 72, no other means than this is required to hold them in assembled position in the mechanism. Provided on opposite faces of levers 82 are curved fulcrum faces 84 and 85 respectively. Fulcrum face 84 cooperates with the outer face of plate 45 when declutching operations are being effected, and fulcrum face 85 cooperates with a hardened steel plug 86 that is frictionally fitted in an aperture 87 formed in the top of saddle member 72.

From the structure so far developed, it will be seen that positive plate 42 is urged toward the flywheel web by direct pressure of spring 77 by virtue of its seat thereon, and is further urged towards the flywheel web by an amplified pressure by the other end of spring 77 which seats upon levers 82 and exert an amplified force upon plate 42 due to the force multiplying effect of the levers. It is further seen, that when the inner ends of levers 82 are moved towards the flywheel web, fulcrum faces 84 will contact with the top of plate 45, thus urging pivots 83 away from the flywheel web, and since pivots 83 are journaled in ears 71 plate 42 is accordingly given a withdrawing movement. Of course at all other times fulcrum faces 85 formed on levers 82 are held in contact with plugs 86 by virtue of the pressure exerted on levers 82 by spring 77, thus urging plate 42 toward the flywheel web.

Formed on the top face of lugs 71 are apertured ears 88 through which a pin may be inserted to hold throwout levers 82 in assembled position with the rest of the mechanism when assembly and disassembly operations are being carried out. The mechanism for causing declutching movement of throwout levers 82 will now be described.

Cooperation with curved faces 91 formed on the inner extremities of levers 82 is the flat face of ball race 92 which cooperates with anti-friction balls 93 disposed therebetween and a similar ball race 94. Ball races 92 and 94 are held in loosely assembled relation with respect to each other by means of the usual retainer member 95. Ball race 94 is rigidly mounted upon sleeve 96, which is slidably mounted upon a hollow supporting member 97 which is preferably integral with clutch housing 1 and is machined and ground so as to be in exact alignment with shaft 5 when the clutch is assembled, and to provide a close fit with sleeve 96. Supporting sleeve 97 is spaced considerably from driven shaft 11 and is accordingly independent thereof. Sleeve 96 is provided with bore 99 into which a grease fitting 101 of well known construction is tapped. Bore 99 communicates with an axially extending passage 102 formed in sleeve 96 so that lubricant introduced through passage 99 provides lubrication for axial movement of sleeve 96 and also provides lubrication for the anti-friction ball bearing assembly, since passage 102 extends to a passage 102' communicating with the anti-friction bearing.

To prevent rotation thereof, sleeve 96 may be keyed or splined upon support 97, in any suitable manner but I prefer to provide an apertured lug 103 on sleeve 96 which is slidably associated with a stud 104 threaded into housing 1. It will accordingly be seen that stud 104 prevents rotation of sleeve 96, but at the same time permits free axial sliding movement thereof upon its support 97. Formed on opposite sides of sleeve 96 are lugs 105 which cooperate with throwout fingers 106 (Figures 1 and 6) mounted on throwout shaft 107 in well known manner to produce declutching movement of the sleeve 96. Shaft 107 is journaled in and extends outwardly of the clutch housing and carries on the end thereof a conventional clutch pedal linkage member (not shown) for imparting rotational movements to shaft 107.

It will be particularly noted that driven shaft 11 fits loosely into supporting sleeve 97, which is stationarily mounted in the housing, and therefore substantial eccentric or angular misalignment of driving shaft 5 and driven shaft 11 can have no effect whatever upon the operation of the throwout bearing assembly. Moreover, since there is slight possibility of driving shaft 5 being thrown out of alignment and the bearing face of supports 97 is carefully machined to lie exactly parallel to the driving shaft 5, their permanent alignment is assured and the throwout bearing assembly, providing spring 77 is properly constructed, will cause plate 42 to be disposed parallel to automatic plate 41 at all times regardless of whether the clutch is engaged or disengaged. Moreover, levers 82 will be held tight at all times regardless of manufacturing inaccuracies or inaccuracies that arise due to wear by the three point engagement of collar 81 with the levers. During clutching and declutching operations the ends of levers 82 will also have a three point support on the face of the throwout bearing assembly, while the throwout bearing is positively maintained in proper alignment by virtue of its stationary guiding means formed on the clutch housing, providing smooth clutch action with minimum pedal operating pressures at all times with a low cost construction.

It should, moreover, be noted that due to the entire absence of an obstructing rim on the flywheel and of the usual cover or any other structure associated with the clutch mechanism that might impede air flow induced by the rotation of the clutch elements, or inhibit free radiation of heat therefrom and also the plane face of the flywheel beyond the driving face thereof, dissipation of heat from the clutch elements by radiation and convection is extremely rapid and there is no tendency to cause overheating and drawing the temperature of springs 27 even under severe conditions of slipping drive, making the incorporation of the torsional dampener thoroughly practical for the first time in a slipping drive of the general type disclosed. Moreover, as the facing material wears and particles of solid lubricant are dislodged therefrom as a consequence thereof, this material is free to leave the clutch mechanism and is carried away by the air stream produced by rotation of the clutch elements. The absence of the usual rim on the flywheel, moreover materially reduces machining and production costs and adapts the mechanism to large volume low cost production methods.

In view of the fact that reacting plug 86 and plate 45 may be adjusted toward and away from the flywheel by means of shims 47 interposed therebetween, if it is found at the factory upon assembling the mechanism that positive plate 42 is disposed in non-parallel relation with automatic plate 41, shims 47 may be inserted or withdrawn from the proper saddle members 72 to bring about parallel relation of the plates. As has been pointed out, plate 45 is held in place on flywheel 8 by means of a single bolt 46, which is independent of saddle member 72, therefore, saddle members 72 may be removed from the clutch mechanism without in any way disturbing the shims 47 and a proper adjustment will thereby be maintained. It is contemplated that this adjustment be in the nature of an initial factory adjustment for the reason that after the clutch mechanism has been in use, there is no tendency for plate 42 to work itself into non-parallel relation with automatic plate 41 because the wear that does occur on the faces of each lever 82, will occur to an equal extent upon each one of them, since they are acted upon by an equal force, namely one third of the total pressure exerted by spring 77, when the spring is properly designed, due to the three-point nature of the connection existing between the spring and the levers.

The clutch mechanism disclosed in Figure 1 is shown in what I term the automatic position with the positive plate 42 spaced from the automatic and driven plate and the engine is presumed to be operating at idling speeds or stationary since automatic weights 52 are shown in their innermost or neutral position. Positive plate 42 is held in this intermediate position by means of a suitable latch associated with the clutch pedal.

With the parts in the position they assume in Figure 1, which corresponds to an engine that is stationary or operating at idling speed and it is desired to effect a driving connection from the engine to the rear wheels, the vehicle may be placed in any gear desired and the latch above referred to operated in order to release the clutch pedal and allow it to move into its retracted position. This retraction of the clutch pedal allows the throwout bearing assembly to move to the right under the influence of springs 77, which, acting through levers 82 brings positive plate 42 into clutching engagement with driven member 17. Such operation is desirable or even necessary for several reasons. For instance, in the winter when the motor is cold and the battery is low, it is sometimes desirable to connect the driving and driven shafts in positive engagement so that the car can be pushed or coasted in order to turn the engine over, or when stopping on a steep hill, a positive engagement of the clutch in low or in reverse gear will provide an additional emergency brake that cannot be inadvertently released, or if the motor stalls due to lack of fuel or any other cause, the car can be pulled out of any dangerous position by driving the car in low gear with the starting motor.

During all other normal driving operations, the positive plate is held in the position shown in Figure 1 by means of the throwout mechanism and latch above referred to.

With the above described clutch mechanism installed in a motor vehicle having a conventional three speed transmission, if it is desired to start the vehicle and the parts are in the position they are shown in Figure 1, and the vehicle is on substantially level ground, the transmission is placed in high gear and the engine accelerated. As the engine gains speed, centrifugal weights 52 gradually swing outwardly and cause automatic plates 41 to move toward and force clutch member 17 against positive plate 42 as has been already described. As weights 52 swing further outwardly, driven member 17 is clamped between plates 41 and 42 and a torque of low magnitude is transmitted to the rear wheels. It should be noted that the movement of plate 41 and consequently the movement of weights 52 is opposed by holdback springs 49 and therefore weights 52 are held under control and do not vibrate or undergo any other desirable movements. Moreover, any possible irregularity of clutch engagement is smoothed out so far as torque delivery is concerned by means of the dampener assembly previously described.

As the weights swing further outwardly, a torque of gradually increasing magnitude is transmitted to the rear wheels due to the reaction of spring 77, which is undergoing compression. The vehicle is thus started smoothly and without shock. When the vehicle, and consequently the engine, obtains sufficient speed, the weights will have swung out to their furthermost limit and will rest against the flywheel web and the plates will be in tight engagement with no slippage between them, and an automatic drive is thus established from the driving to the driven shaft. In this connection it should be noted that when the positive plate moves in response to movement of plate 41, throwout levers 82 will swing out of contact with the face of ball race 92 and therefore no wear of the ball bearing unit will take place under these conditions.

When operating the vehicle in this manner all that is necessary to bring it to a stop is to release the accelerator and apply the brakes. When the vehicle has decelerated to a speed corresponding substantially to engine idling speed through the combined braking action of the engine and the brake mechanism, centrifugal weights 52 will move inwardly to their neutral position and release the clutch and the vehicle may be brought to a complete stop by continued application of the brakes or if traffic conditions permit, the accelerator may be depressed and the engine speed accelerated to cause almost immediate reengagement of the clutch and the vehicle is again picked up in high gear. When operating in high gear or any other gear, and a grade is encountered that requires more torque than the engine can deliver in that particular gear, under the engine speed conditions existing at the time, the engine will naturally decelerate under such excess load, and when sufficiently decelerated, weights 52 will swing inwardly to a slight extent and permit slippage between the clutch plates. Since it is an inherent characteristic of an internal combustion engine to deliver more torque as the speed thereof is increased up to its peak of torque output, the speed of the engine, through the slipping drive conditions existing at this time, will be accelerated sufficiently for it to develop sufficient torque to carry the vehicle over the grade, thus doing away with the necessity of shifting the transmission into a lower gear so long as the engine can deliver the required torque. As the vehicle gains speed up the grade, or the vehicle again reaches substantially level ground, weight 52 will again swing out and contact with the flywheel web and will thus exert sufficient pressure on automatic plate 41 to again establish a non-slipping drive between the clutch plates and the driven member.

This mode of operation, which permits operation of the usual motor vehicle in high gear for normal starting and operation is made possible by the lubricated character of the facing material that is employed in the present clutch mechanism in combination with effective ventilating and dust removing capacities of the present clutch structure. It is, therefore, seen that this mechanism constitutes a variable speed drive as well as a clutch mechanism.

When the automatic plate, in response to the centrifugal weights, has moved to engaging position against the action of its hold-back springs and the weights lie in contact with the flywheel web, the positive plate may be backed away from the remaining clutch plates by manual depression of the clutch pedal. There is then no contact between the plates and no driving connection between the driving and driven shaft. In traffic, when it is desired to get the vehicle away quickly and in starting up grades, the clutch pedal may be operated in this manner to disengage the clutch between each gear shifting operation as in a vehicle of the type provided with a conventional manually operable clutch. However, with the present drive and clutch mechanism, it is contemplated to start the vehicle in high gear under normal operating conditions.

In connection with the device so far developed, it will be seen that a device is produced which provides controlled free-wheeling without the necessity of imposing a free-wheeling unit between the engine and the final drive. As soon as the engine is operating in high gear at any substantial speed, all that it is necessary to do to free wheel, is to release the accelerator and to momentarily depress the clutch pedal from its automatic position into its manually declutched position and shortly thereafter, due to the engine dropping to idling speed, weights 52 will cause separation of the clutch plates. The clutch pedal is then released and returned to normal automatic position. The vehicle will then coast as there is no torque transmitting connection between the engine and the rear wheels. When it is again desired to drive the vehicle under the power of the engine, the engine is accelerated which will cause the centrifugal mechanism to reengage the clutch plates.

Cooling of the clutch elements and removal of any solid lubricant freed from the clutch facings is effected by air current induced by the rotation of the clutch elements and drawn into the mechanism through screen 3. The air current is drawn along the cutch axis and thence flows outwardly on the faces of the clutch plates, a portion of the air stream entering apertures 18' in disk 17 and flowing on the other side thereof, and between the automatic plate and the flywheel web.

The continuous outward flow of air over both faces of disk 17 effectively cools all of the clutch elements, and at the same time prevents the conduction of heat inwardly to the dampener assembly, thereby avoiding the possibility of drawing or seriously modifying the temper of leaf springs 27 thereof.

The heated dust laden air may be exhausted in any desired manner. In the present instance, however, I prefer to exhaust the air from the clutch housing through screen 3, one-half of screen 3 functioning as an air inlet and the other half as an outlet for the heated air, an arrangement that has proved to be very satisfactory in practice.

Referring to Figure 9 of the drawings, the clutch mechanism disclosed in Figure 1 is shown, with a modified spring construction and modified throwout bearing assembly incorporated therein. In view of the fact that many of the parts are of the same construction and have the same functions as those shown in Figure 1 and the entire device functions in the same general manner as that heretofore described, like reference characters will be given to like parts. In the present embodiment of the invention, the single spring 77 shown in the device of Figure 1, is replaced by a plurality of springs disposed between annular members reacting against positive plate 42 and the inner ends of levers 82. Positive plate 42 is provided with an annular seat 111 against which an annular reacting plate 112 having a flange 113 is adapted to rest. Plate 112 receives the reaction of the springs and transmits it to positive plate 42 and is made of sheet metal in channel form to give the same rigidity. Plate 112 is provided at suitable intervals around its periphery with depressed portions 114 which are adapted to center and form a seat for one end of compression springs 115. Preferably, but not necessarily, interposed between springs 115 and plate 112 are heat insulating washers 116, which may consist of any suitable material having the proper heat insulating properties, for preventing the transfer of heat from positive plate 42 to springs 115 so that their proper temper may be maintained under severe conditions of abuse of the mechanism.

The other ends of springs 115 cooperate with annular plate 117 which is provided with annular depressions 118 for centering the springs. Springs 115 seat directly against plate 117, which is provided at 120° intervals about its periphery with offset portions to receive throwout levers 82 and plate 117 is reenforced in this region by suitable forming operations. The inner edge of plate 117 is provided with a tubular portion extending toward the flywheel web and which terminates in an annular flange 121 normal to the clutch axis. Seating on flange 121 and preferably secured thereto by spot welding or the like is a relatively thick steel ring 122 for a purpose that will become apparent. Ring 122, in response to the action of spring 115, is urged to the right and rests against curved faces 123 formed on throwout levers 82. Throwout levers 82 extend through slots in the flange of plate 117 for cooperation with ring 122. Curved face 91 formed on throwout levers 82 cooperates with ball race 92 in the manner previously described. In view of the fact that levers 82 are three in number, the action thereof would produce localized stresses in flange 121 if it contacted them directly, therefore ring 122, being of substantial thickness and rigidity, distributes the reaction pressure of the throwout levers around the entire periphery of flange 121, which is of relatively light gauge metal, thereby avoiding distortion thereof.

While plate 117 has been described as having offset portions to allow swinging movements of levers 82, it is to be understood that in some instances, where plate 117 is spaced sufficiently from levers 82, plate 117 may consist of a complete annulus. Moreover, plates 114 and 117 have been shown and described as consisting of sheet metal, and although this material is preferred, due to its low cost and workability, it is to be understood that cast material may be employed without departing from the spirit of the present invention.

It will be seen from the structure just described that the spring means here employed operates in substantially the same manner as the single spring 77 in the modification of the invention previously described. Flange 121 and ring 122, which correspond to collar 81 in the previous modification, are free to rock and will assume a stable position in contact with all three throwout levers 82 with a three-point support, so that each lever 82 is held tight at all times and each takes one-third of the total pressure exerted by springs 115. The use of the spring cluster in this form of invention in place of the spring 77 in the first form described permits more facile and lower cost production due to the lower cost and greater ease of securing uniformity of the smaller springs.

A modified form of throwout mechanism is also disclosed in connection with this embodiment of the invention wherein means are provided for lubricating the pilot bearing for shaft 11. Ball race 94 is rigidly mounted upon a sleeve 125 which is mounted for axial sliding movement upon a support 126, which is supported from the clutch housing in a manner similar to support 97 disclosed in Figure 1 of the drawings. However, in the present instance support 126 is of special configuration, having an annular offset portion 127 providing an annular chamber 128.

Driven shaft 11 is provided with a central bore 129 which extends entirely through reduced portion 12 of shaft 11 in one direction and at the other communicates with a transverse bore 131 into which is tapped a suitable grease fitting 132 of well known construction. The annular offset portion of support 126 is cut away preferably at the top thereof sufficiently to allow the introduction of a greece gun for cooperation with grease fitting 132 and sleeve 125 is likewise apertured in the upper region thereof. It will be seen that rotation of grease fitting 132 with shaft 11 is permitted by the annular chamber 128, and when it is desired to grease the pilot bearing, screen 3 is removed and shaft 11 rotated in any suitable manner to bring grease fitting 132 in coincidence with the apertures formed in members 127 and 125. The grease or other suitable lubricant is introduced into passages 131 and 129 and is then introduced into the anti-friction pilot bearing assembly 13 located in the flywheel web and which is provided with a suitable grease retaining construction that prevents loss of lubricant to the clutch plates.

Lubrication for the sliding movement of sleeve 125 upon support 126 is provided by a grease fitting 133 which is tapped into a passage 134 communicating with a lubricant distributing groove 135 located in sleeve 125. Access to this grease fitting is also gained through screen 3.

Formed on opposite sides of sleeve 125 are lugs 136 which cooperate with throwout fingers 137 connected by yoke 138. Rigidly secured to yoke 138 are shafts 139 and 141 which are journaled in the clutch housing in well known manner (not shown). Mounted on the end of shaft 141 is the usual clutch pedal linkage (not shown) with which is associated a suitable latch of the character above mentioned for holding the clutch elements in automatic position. Formed on sleeve 125 is an apertured ear or lug member 142 which cooperates with a stud 143 secured in the clutch housing to prevent rotation of sleeve 125 on support 126, and at the same time permit axial sliding movement thereof as explained in connection with the modification of the invention in the figures previously described.

The operation of this embodiment of the invention is substantially the same as that previously described, and therefore will not be repeated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a drive and clutch mechanism, a driving member providing a flat reaction wall and having apertures formed therein; a driving clutch plate mounted for rotation with said driving member and for movement axially thereof; centrifugal means for urging said clutch plate away from said driving member when said driving member reaches a predetermined speed, said centrifugal means comprising a plurality of weight levers extending through said apertures and having heads thereon disposed between said reaction wall and a flat surface provided on said driving clutch plate, said heads being of a size to pass easily through said apertures and means associated with said driving plate for retaining said levers in assembled position, and for compelling said heads to rock about definite axes on said flat surface of said driving clutch plate, comprising an inwardly facing wall provided on said clutch plate and abutting the outer portions of said heads.

2. The drive and clutch mechanism set forth in claim 1 wherein said retaining means comprises an annular groove formed in said driving plate and presenting faces against which said heads are adapted to bear to prevent rotational movement thereof.

3. In a drive and clutch mechanism, a driving member; common means mounting an automatic and a positive plate for rotation with said driving member and for movement axially thereof; said means comprising bracket assemblies which are adapted to embrace lug portions provided on one of said plates, said other plate having recesses in which portions of said brackets are adapted to seat; a driven member; frictional means associated with said driven member mounted for movement axially thereof and adapted to be engaged and clamped between said plates and driven thereby; and centrifugally operable means associated with said automatic plate for causing the same to engage and drive said frictional means when said driving member reaches a predetermined speed.

4. In a clutch mechanism, a flywheel having a substantially plane face extending to the outer periphery thereof; a driving plate mounted for rotation with said flywheel and having a driving face disposed substantially in the plane of said flywheel face; a second driving member; a driven member disposed, and adapted to be gripped between said driving members, said last-named members being disposed wholly to one side of said flywheel face; means for forcing said driving members into engagement with said driven member and for establishing a slipping, power-transmitting drive therebetween when said driving members attain a predetermined speed; means for coupling said driving members to said flywheel for synchronous rotation therewith, said coupling means being disposed outwardly of the outer periphery of said members and being so designed as to present surfaces having negligible circumferential area, whereby air may flow freely outwardly over said members and rapidly remove heat therefrom during operation of the mechanism, said coupling means also supporting spring reaction means for said second driving member, thereby eliminating the need for a cover member and further increasing the heat dissipating capabilities of the mechanism.

5. The mechanism described in claim 4 wherein said coupling means comprises keeper members secured to the face of said flywheel.

6. The mechanism described in claim 4, wherein said coupling means comprises apertured keeper members secured to the face of said flywheel and one of said driving members is provided with lugs which extend through said keeper members.

7. In a clutch mechanism, in sub-combination, a rotatable supporting member; a driving plate having recesses provided in its periphery; a plurality of elements secured in said member and having leg portions disposed in said recesses to thereby couple said driving plate and said member; and a second driving plate and a plurality of keeper members secured to said elements and cooperating with lugs provided on said second driving plate.

8. In an automatic clutch, in sub-combination, a centrifugally operable lever element having a flat elongated configuration, said element being provided at one end thereof with a fulcrum portion extending from side to side of said element and disposed at right angles to its longitudinal axis, said element being provided at its other end with a bearing face disposed substantially at right angles to its longitudinal axis, and means for securing a centrifugal mass to said element in surface engagement with said bearing face, comprising at least two longitudinally disposed threaded members carried by said lever element and projecting beyond the bearing face thereof and extending through said centrifugal mass, said centrifugal mass comprising a plurality of metal plates.

9. In a drive and clutch mechanism, a driving member; an automatic plate and a positive plate mounted for rotation with said driving member and for movement axially thereof; a driven member; frictional means associated with said driven member mounted for movement axially thereof and adapted to be engaged and driven by and clamped between said plates; centrifugally operable means associated with said automatic plate for causing the same to engage and drive said frictional means when said driving member reaches a predetermined speed, resilient means associated with said positive plate for opposing the action of said centrifugal means; lever means for withdrawing said positive plate into disengaged position against the action of said resilient means; means fulcruming said lever means on said driving member comprising a plurality of apertured members, having fulcruming faces, secured to said driving member and through which said lever means extends, and means associated with said apertured members permitting adjustment thereof toward and away from said driving member, whereby substantial parallelism of said driving member and said positive plate may be established.

10. In a drive and clutch mechanism, a driving member; an automatic plate and a positive plate mounted for rotation with said driving member and for movement axially thereof; a driven member; frictional means associated with said driven member mounted for movement axially thereof and adapted to be engaged and driven by and clamped between said plates; centrifugally operable means associated with said automatic plate for causing the same to engage and drive said frictional means when said driving member reaches a predetermined speed, resilient means associated with said positive plate for opposing the action of said centrifugal means; lever means for withdrawing said positive plate into disengaged position against the action of said resilient means; means fulcruming said lever means on said driving member comprising a plurality of apertured members, having fulcruming faces, secured to said driving member and through which said lever means extends; means associated with said apertured members permitting adjustment thereof toward and away from said driving member, whereby substantial parallelism of said driving member and said positive plates may be established, said means comprising a plurality of shims disposed between said apertured members and the face of said driving members; and means whereby said apertured members may be removed from said driving member without disturbing said shims.

11. In a clutch, in sub-combination, a pair of members mounted for rotation and for relative axial movement; means for forcing said members away from each other comprising a plurality of levers having fulcrum portions disposed between said members; and means for holding said levers in assembled relation with said members; comprising an arcuately shaped recess, having inner and outer cylindrical walls, formed in one of said members and in which the fulcrum portions of said levers are chordally disposed; the fulcrum portions of said levers each contacting the outer wall of said recess at two points and contacting the inner wall of said recess at one point, for restraining said fulcrum portions against substantial bodily outward and inward movement, respectively, the fulcrum portion of each lever having a relieved portion adjacent the outer cylindrical wall of said recess for permitting said levers to rock outwardly without interference therewith.

12. The device described in claim 11, wherein said fulcrum portions of said levers are adapted to fulcrum in said recess and react against surface portions of said other member.

ROBERT P. LEWIS.